(12) United States Patent
Singh et al.

(10) Patent No.: US 9,128,953 B1
(45) Date of Patent: Sep. 8, 2015

(54) ASYNCHRONOUS MULTI-NODE FILESYSTEM COORDINATED REPLICATION

(75) Inventors: Pratap Singh, Fremont, CA (US); Hua Zhong, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 860 days.

(21) Appl. No.: 12/460,677

(22) Filed: Jul. 21, 2009

(51) Int. Cl.
*G06F 17/30* (2006.01)

(52) U.S. Cl.
CPC ................. *G06F 17/30212* (2013.01)

(58) Field of Classification Search
CPC ............... G06F 17/30215; G06F 17/30575; G06F 3/065; G06F 11/2094; G06F 3/0647; G06F 11/1458
USPC .................................... 707/610–626
See application file for complete search history.

(56) References Cited

U.S. PATENT DOCUMENTS

| 7,739,240 B2 * | 6/2010 | Saito et al. ..................... 707/634 |
| 7,917,469 B2 * | 3/2011 | Bernhard et al. ............. 707/610 |
| 2002/0143798 A1 * | 10/2002 | Lisiecki et al. ............... 707/200 |
| 2004/0111390 A1 * | 6/2004 | Saito et al. ........................ 707/1 |
| 2009/0030986 A1 * | 1/2009 | Bates ............................ 709/205 |

* cited by examiner

*Primary Examiner* — Sheree Brown
(74) *Attorney, Agent, or Firm* — Van Pelt, Yi & James LLP (57) ABSTRACT

A system for replicating a filesystem running on multiple nodes comprising an originator system and a replica system. The originator system includes a plurality of nodes. The replica system includes a plurality of nodes and a processor. The plurality of nodes of the replica system are paired with the plurality of nodes of the originator system. The processor is configured to receive an indicator of a node of the plurality of nodes of the replica system finishing replication for a view of a filesystem at a point in time. The processor is further configured to indicate that replication for the view of the filesystem is complete in the event that all replica system nodes have received their indication for the view.

27 Claims, 10 Drawing Sheets

| Back End Node Version Table | | |
|---|---|---|
| Back End Node 1 | Back End Node 2 | Back End Node 3 |
| 1 | 1 | 1 |
| 2 | 2 | 2 |
| 3 | 3 | |
| | 4 | |

Fig. 10 ously. The scope of the
ASYNCHRONOUS MULTI-NODE FILESYSTEM COORDINATED REPLICATION

BACKGROUND OF THE INVENTION

Enterprises as well as individuals are becoming increasingly dependent on computers. As more and more data are generated, the need for efficient and reliable filesystems is increasing. There are a variety of filesystems in existence today, utilizing both local and remote storage. Some filesystems use both a local filesystem and a replica filesystem in a remote location in order to ensure the safety of the data by copying the data from the local to the replica system. Some filesystems comprise many sub-systems in order to allow modular scaling as the amount of data stored gets larger. If a local filesystem and a replica filesystem each comprise many sub-systems, ensuring a consistent view of the data on both systems can become complicated.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Asynchronous multi-node coordinated filesystem replication is disclosed. A primary filesystem stores information as a collection of chunks of data, distributed across one or more storage nodes. The storage nodes, also known as back end nodes, are each nominally identical hardware systems, designed such that the entire system can be scaled modularly by selecting the number of nodes appropriate to the application using it. The primary filesystem also comprises a controller node, also known as a front end node, that manages separation of the data into chunks and controls which portions are stored on which storage node. The back end nodes each comprise a processor, memory, and high-volume data storage. In some embodiments, the front end node comprises a set of instructions for controlling the back end nodes residing in the memory of one or more of the back end nodes. In some embodiments, the front end node comprises a set of instructions for controlling the back end nodes residing in the memory of an additional computer with a processor, memory, and data storage. In various embodiments, the collection of front end node and one or more back end nodes is packaged together into a single computer assembly, is executed using one or more processors, is executed using one or more virtual computer processes, or is executed using any other appropriate combination of hardware and/or software environment.

A replica system comprises a front end node and a set of back end nodes, where the number of back end nodes is the same as the number of back end nodes in the primary system. Each back end node on the primary system is assigned a corresponding back end node on the replica system. When a new set of data is received by the primary system, it is broken into chunks by the front end node of the primary system. These chunks are stored on the back end nodes of the primary system and transmitted to the corresponding back end nodes of the replica system, where they are also stored. After a back end node of the primary database has transmitted its data to the corresponding back end node of the replica database, the back end node transmits a data chunk known as a prime segment to its corresponding back end node. The prime segment comprises system metadata, a data version number corresponding to a consistent view of the data stored on the system, and an indication that a consistent state has been transferred. Each time a back end node on the replica receives a prime segment, the back end node transmits the version number to the front end node on the replica system. When the front end node on the replica system has received the same version number from every back end node on the replica system, the front end node knows the entire set of new data corresponding to that version has been transmitted, and the front end node makes the new version of the filesystem, including the new data, available to a user of the filesystem. If multiple version updates are in progress simultaneously, the front end node tracks the version numbers received from each back end node and makes available to a user the most recent data version received by all back end nodes.

In some embodiments, an indicator is received of a node of a plurality of nodes of a replica system finishing sending data for a view of a filesystem at a point in time. Each of the plurality of nodes of the replica system are paired with a node of a plurality of nodes of an originator system. In the event that all replica system nodes have received their indication of the view, an indication is indicated that replication for the view of the filesystem is complete.

Figure 1:
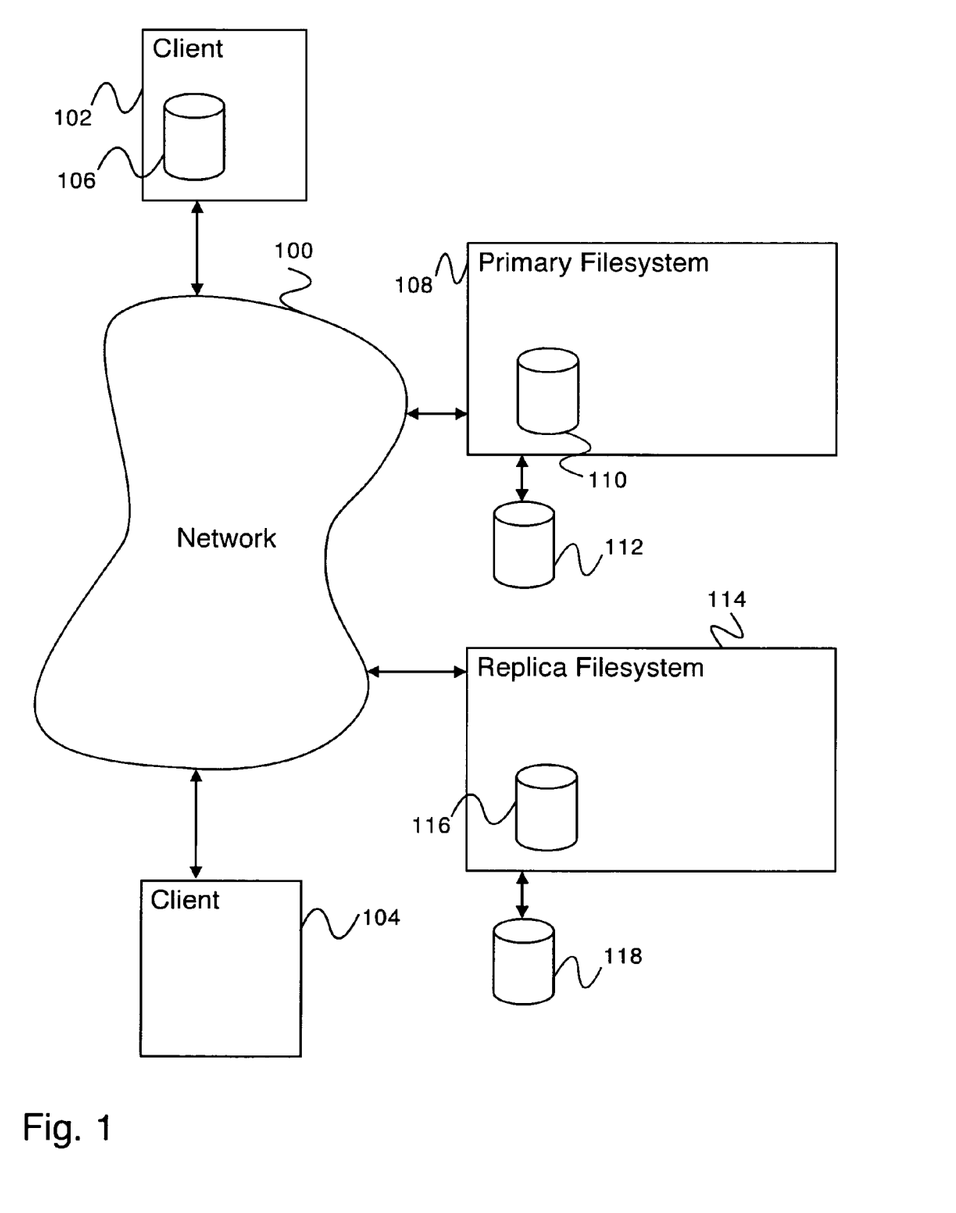
FIG. 1 is a block diagram illustrating an embodiment of a system for asynchronous multi-node coordinated filesystem replication.

FIG. 1 is a block diagram illustrating an embodiment of a system for asynchronous multi-node coordinated filesystem replication. In the example shown, network 100 connects to one or more clients, represented in FIG. 1 by client 102 and client 104. A client may have a local storage device in addition to local memory. For example, client 102 has storage device 106, whereas client 104 does not have a local storage device. Network 100 also connects to primary filesystem 108 and replica filesystem 114. Primary filesystem 108 stores data either using internal storage device 110 or attached external storage device 112. Replica filesystem 114 stores data either using internal storage device 116 or attached external storage device 118. Replica filesystem 114 serves to provide an additional copy in case of failure of primary filesystem 108, and also to provide a physically remote copy of the filesystem such that the backed up data can be accessed rapidly by users in a different location.

In some embodiments, the data storage associated with primary filesystem 108 (e.g., internal storage device 110 or attached external storage device 112) is comprised of one or more back end nodes. In some embodiments the data storage associated with replica filesystem 114 (e.g., internal storage device 116 or attached external storage device 118) is comprised of the same number of back end nodes as the data storage associated with primary filesystem 108. In some embodiments, replica filesystem 114 maintains a replica of the data stored on primary filesystem 108. In some embodiments, primary filesystem 108 and replica filesystem 114 use asynchronous multi-node coordinated filesystem replication maintain synchronization of the data stored by primary filesystem 108 and replica filesystem 114.

Network 100 comprises one or more of the following: a local area network, a wide area network, a wired network, a wireless network, the Internet, a fiber network, a storage area network, or any other appropriate network enabling communication. In various embodiments, Client 102 and client 104 are in physical proximity, are physically remote from one another, or are in any other appropriate location. In various embodiments, primary filesystem 108 and replica filesystem 114 are located in proximity to one, both, or neither of client 102 and/or client 104, or are in any other appropriate location.

In various embodiments, storage devices 106, 110, 122, 116, and/or 118 comprise a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

In various embodiments, primary filesystem 108 comprises one or more processors as part of one or more physical units (e.g., computers or other hardware units). In various embodiments, replica filesystem 114 comprises one or more processors as part of one or more physical units (e.g., computers or other hardware units).

In some embodiments, files or data stored on a client are stored on primary filesystem 108. The files or data are broken into segments by primary filesystem 108. A mapping is stored between the files or data and the segments. For example, file A comprises segment 1, 3, 85, 8, and 12, etc. If an identical segment is already stored by primary filesystem 108, a pointer to the segment is stored. If a similar segment is already stored by primary filesystem 108, a pointer to the similar previously stored segment is stored as well as the difference between the similar previously stored segment and the new segment to be stored. The mapping along with the pointers, stored segments and stored similar segments and differences from the similar segments can be used to reconstruct the original files or data. In some embodiments, when files are transferred from primary filesystem 108 to replica filesystem 114 they are transferred in groups of one or more segments at a time.

In various embodiments, segments are generated by identifying segment endpoints using content based algorithm (e.g., in a window of data a hash function on the window is equal to a number, is a minimum/maximum/extrema value for all windows, has a pattern of 1's or 0's in predetermined bit locations, etc.), using a non-content based algorithm (e.g., has a predetermined length, has a minimum length, a maximum length, associated with a file length, etc.), or a combination of the content based and non-content based algorithms, or any other appropriate manner of determining segment endpoints.

Figure 2:
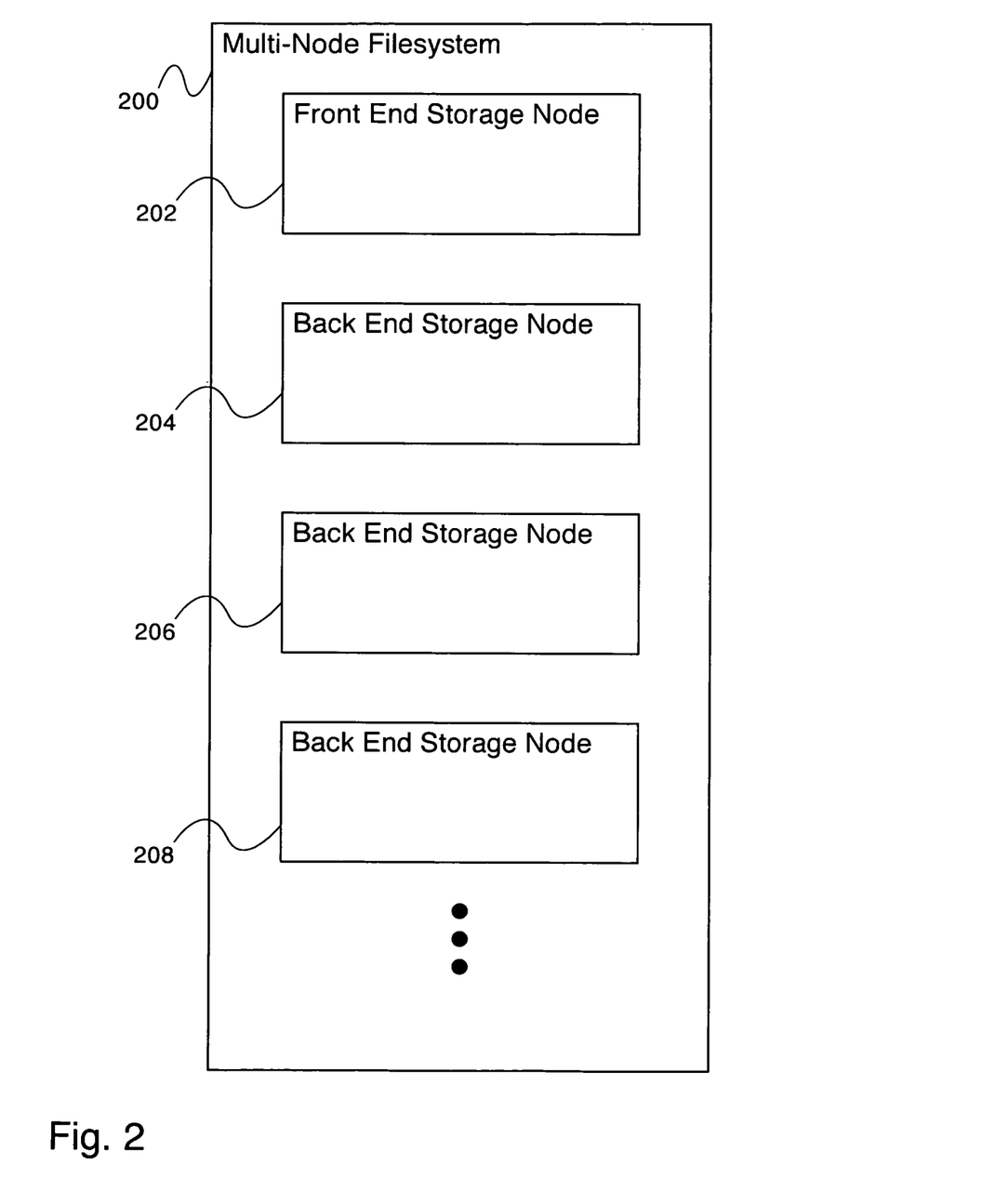
FIG. 2 is a block diagram illustrating an embodiment of a multi-node filesystem.

FIG. 2 is a block diagram illustrating an embodiment of a multi-node filesystem. In some embodiments, multi-node filesystem 200 of FIG. 2 implements primary filesystem 108 of FIG. 1 or replica filesystem 114 of FIG. 1. In the example shown, multi-node filesystem 200 comprises front end storage node 202, back end storage node 204, back end storage node 206, and back end storage node 208. In various embodiments, multi-node filesystem 200 comprises one back end storage node, three back end storage nodes, eight back end storage nodes, or any other appropriate number of back end storage nodes. In the example shown, filesystem 200 appears as a single unit to a user despite being broken in distinct nodes. When a user sends data to the filesystem to be stored, the data is received by front end storage node 202. Front end storage node 202 breaks each received data file into segments and directs each segment to one of the one or more back end storage nodes, where the segment is stored. Front end storage node 202 also creates a namespace mapping each received file to the set of segments the file was broken into and the location of each segment, allowing files to be reconstructed from their constituent segments. The namespace is broken into segments, and each segment is stored on one of the back end storage nodes. Front end storage node 202 then generates a prime segment for each back end storage node, comprising information on the storage location of the segment or segments of the namespace stored on that back end storage node. The prime segment is stored in a predetermined location on the back end storage node, enabling front end storage node 202 to recover the prime segment without any prior knowledge. Front end storage node 202 is able to locate each segment of the namespace by reading the prime segment stored on each back end storage node. The namespace can be reconstructed from the segments, and using the namespace the segments comprising any file stored in the filesystem can be reconstructed.

In some embodiments, each back end storage node comprises an independent computer, including a processor or processors, memory, and data storage. In some embodiments, the front end node also comprises an independent computer.

In some embodiments, the front end storage node comprises code stored on the hardware comprising one or more of the back end nodes and is executed by the processor or processors associated with one or more of the back end nodes. In some embodiments, the computer or computers comprising filesystem 200 are packaged and sold as a single unit, and function to a filesystem user as a single computer.

Figure 3:
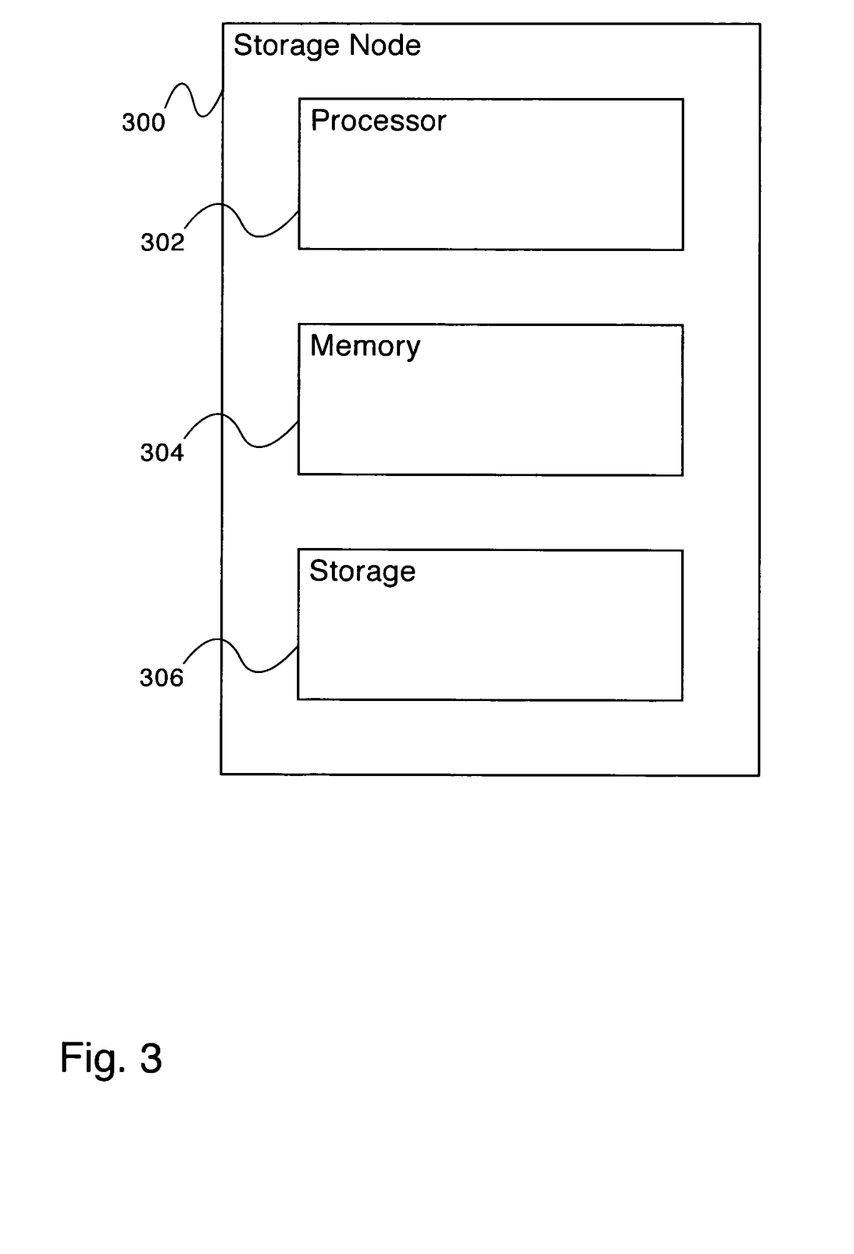
FIG. 3 is a block diagram illustrating an embodiment of a storage node.

FIG. 3 is a block diagram illustrating an embodiment of a storage node. In some embodiments, the storage node of FIG. 3 is a back end storage node (e.g., back end storage node 204, 206, or 208 of FIG. 2). In some embodiments, the storage node of FIG. 3 is a front end storage node (e.g., front end storage node 202 of FIG. 2). In the example shown, storage node 300 of FIG. 3 comprises processor 302, memory 304, and storage 306. Processor 302 includes instructions for asynchronous multi-node coordinated filesystem replication. In various embodiments, in the event that storage node 300 is a back end storage node, processor 302 includes instructions for receiving data from a front end node, sending data to a replica back end node, receiving data from a primary back end node, storing data, reporting receipt of a prime segment, or any other appropriate back end node instructions. In various embodiments, in the event that storage node 300 is a front end storage node, processor 302 includes instructions for dividing received data into chunks, sending, data to a back end node, creating a namespace, updating a namespace, recreating a namespace stored on back end nodes, retrieving a requested file from back end nodes, maintaining a back end node version table, determining the most recent version of the system that has been completely received from a back end node version table, or any other appropriate front end storage node instructions. In the example shown, processor 302 is assisted by memory 304, and stores data in storage 306.

Figure 4:
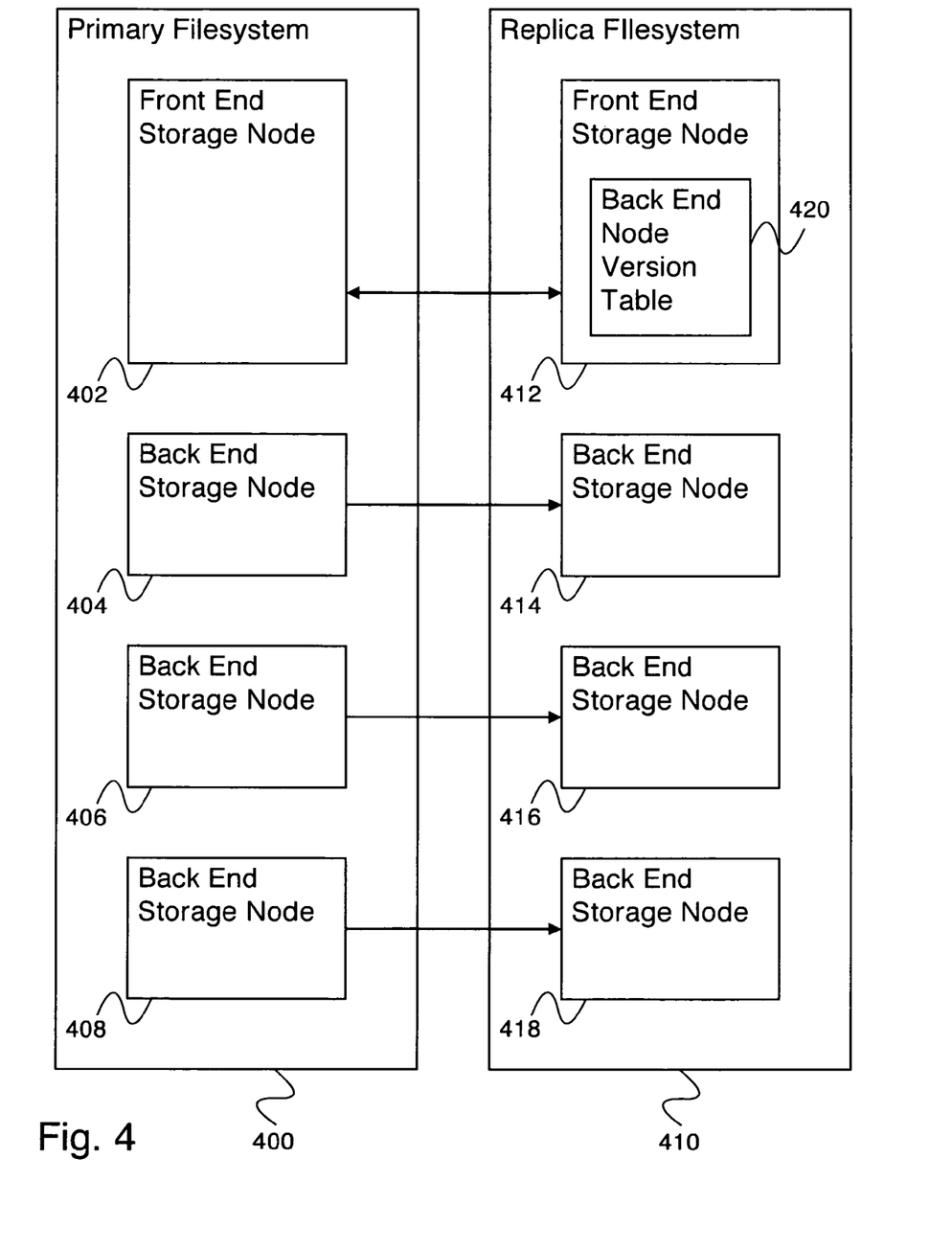
FIG. 4 is a block diagram illustrating an embodiment of a replicating system using asynchronous multi-node filesystem coordinated replication.

FIG. 4 is a block diagram illustrating an embodiment of a replicating filesystem using asynchronous multi-node coordinated filesystem replication. In some embodiments, primary filesystem 400 comprises primary filesystem 108 of FIG. 1, and replica filesystem 410 comprises replica filesystem 114 of FIG. 1. In the example shown, primary filesystem 400 comprises front end storage node 402, back end storage node 404, back end storage node 406, and back end storage node 408. Replica filesystem 410 comprises front end storage node 412, back end storage node 414, back end storage node 416, and back end storage node 418. In some embodiments, in a system for asynchronous multi-node coordinated filesystem replication, a primary filesystem and a replica filesystem each have one front end storage node and are required to have the same number of back end storage nodes.

In some embodiments, when primary filesystem 400 receives data to store, front end storage node 402 divides the data into segments which are stored on back end storage node 404, back end storage node 406, and back end storage node 408. Front end storage node 402 then creates a namespace, comprising information for reconstructing the data from the segments stored on the back end storage nodes, and stores the namespace in segments on the back end storage nodes. Front end storage node 402 finally creates a prime segment, comprising information for reconstructing the namespace from the segments stored on the back end storage nodes, as well as a version number indicating the current version of the namespace. The prime segment is stored in a predetermined location on each of the back end storage nodes.

When a back end storage node in the primary filesystem (e.g., back end storage node 404, back end storage node 406, or back end storage node 408) receives data to be stored (e.g., a segment of data received by the front end storage node to be stored, a segment of a namespace, or a prime segment) the back end storage node stores the data and transmits the data to the corresponding back end storage node of replica filesystem 410. For instance, when back end storage node 404 receives data, it stores the data and then transmits it to back end storage node 414. When back end storage node 406 receives data, it stores the data and then transmits it to back end storage node 416. When back end storage node 408 receives data, it stores the data and then transmits it to back end storage node 418. When new data is received by primary filesystem 400, front end storage node 402 transmits one or more data segments to each back end storage node, then transmits one or more namespace segments to each back end storage node, then transmits a prime segment to each back end storage node. Each back end storage node in the primary filesystem stores and transmits the one or more data segments to its corresponding back end storage node in the replica filesystem, then stores and transmits the one or more namespace segments to its corresponding back end storage node in the replica filesystem, then stores and transmits the prime segment to its corresponding back end storage node in the replica filesystem. In some embodiments, the data segments are broken into enumerated data packets and transmitted in order, enabling the receiving node to recognize if a packet has been lost. In some embodiments, during system configuration, the number of back end storage nodes in primary filesystem 400 and the number of back end storage nodes in replica filesystem 410 are compared, and the system is only enabled for asynchronous multi-node coordinated filesystem replication if they are the same. In some embodiments, during system configuration, each back end storage node in primary filesystem 400 is assigned a corresponding back end storage node in replica filesystem 410. In some embodiments, each back end storage node in primary filesystem 400 is configured to only be able to transmit data to its corresponding back end storage node in replica filesystem 410.

When a back end storage node in replica filesystem 410 (e.g., back end storage node 414, back end storage node 416, or back end storage node 418) receives data from its corresponding back end storage node in primary filesystem 400, it stores the data. If the data received comprises a prime segment, the back end storage node reports the version number stored in the prime segment to front end storage node 412. When front end storage node 412 receives a prime segment version number from a back end storage node, it records the version number and which back end storage node it received the segment from into back end node version table 420. By examining back end node version table 420, front end storage node 412 is able to determine if all of the segments of a particular update to the system have been received by all of the back end storage nodes of replica filesystem 410. When all of the segments of a particular update to the system have been received by all of the back end storage nodes of replica filesystem 410, front end storage node 412 makes that particular update (e.g., an associated prime segment) to the system available to a user of replica filesystem 410.

Figure 5:
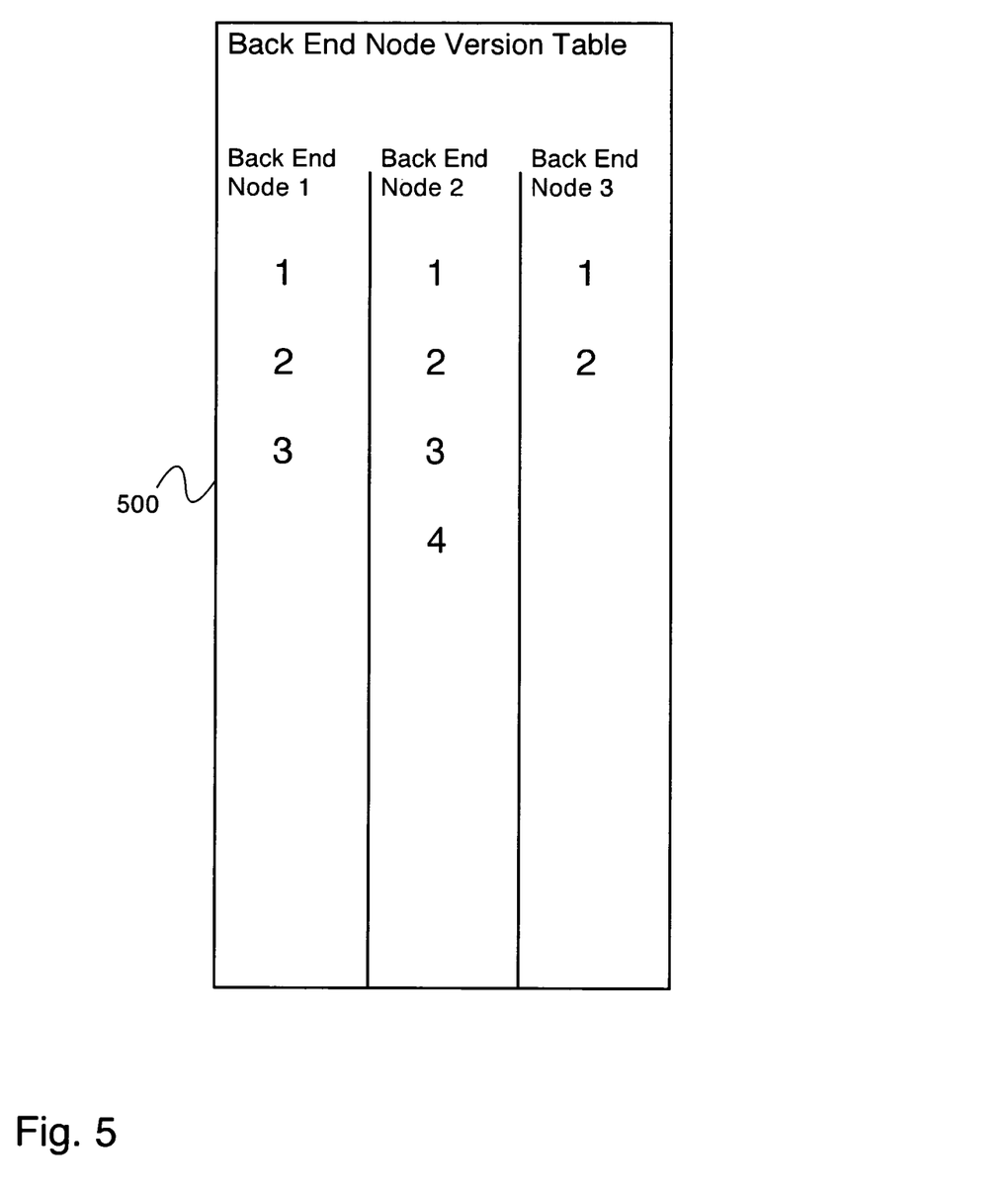
FIG. 5 is a diagram illustrating an embodiment of a back end node version table.

FIG. 5 is a diagram illustrating an embodiment of a back end node version table. In some embodiments, back end node version table 500 comprises back end node version table 420 of FIG. 4 and is maintained by front end storage node 412 of FIG. 4. In the example shown, each column of back end node version table 500 corresponds to a back end storage node. In some embodiments, each column of back end node version table corresponds to one of the back end storage nodes of replica filesystem 410 of FIG. 4 (e.g., the column labeled "Back End Node 1" corresponds to back end storage node 414 of FIG. 4, the column labeled "Back End Node 2" corresponds to back end storage node 416 of FIG. 4, and the column labeled "Back End Node 3" corresponds to back end storage node 418 of FIG. 4). When the front end storage node that maintains back end node version table 500 receives an indication that a prime segment (e.g., the prime segment associated with a particular back end storage node and a particular version number) has been received by a back end storage node, the front end storage node adds an indication of the prime segment version to the column of back end node version table 500 corresponding to the back end storage node that received the prime segment. In the example shown, the back end storage node corresponding to the column labeled "Back End Node 1" has received prime segment version 1, 2, and 3; the back end storage node corresponding to the column labeled "Back End Node 2" has received prime segment version 1, 2, 3, and 4, and the back end storage node corresponding to the column labeled "Back End Node 3" has received prime segment version 1 and 2. The front end node that maintains back end node version table 500 makes available to a filesystem user the most recent version of the system that has been received by all back end storage nodes. The most recent version of the system that has been received by all back end storage nodes is determined by comparing the columns of back end node version table 500. In the example shown, the most recent version of the system that has been received by all back end storage nodes is version 2, so version 2 is made available to a filesystem user.

Figure 6:
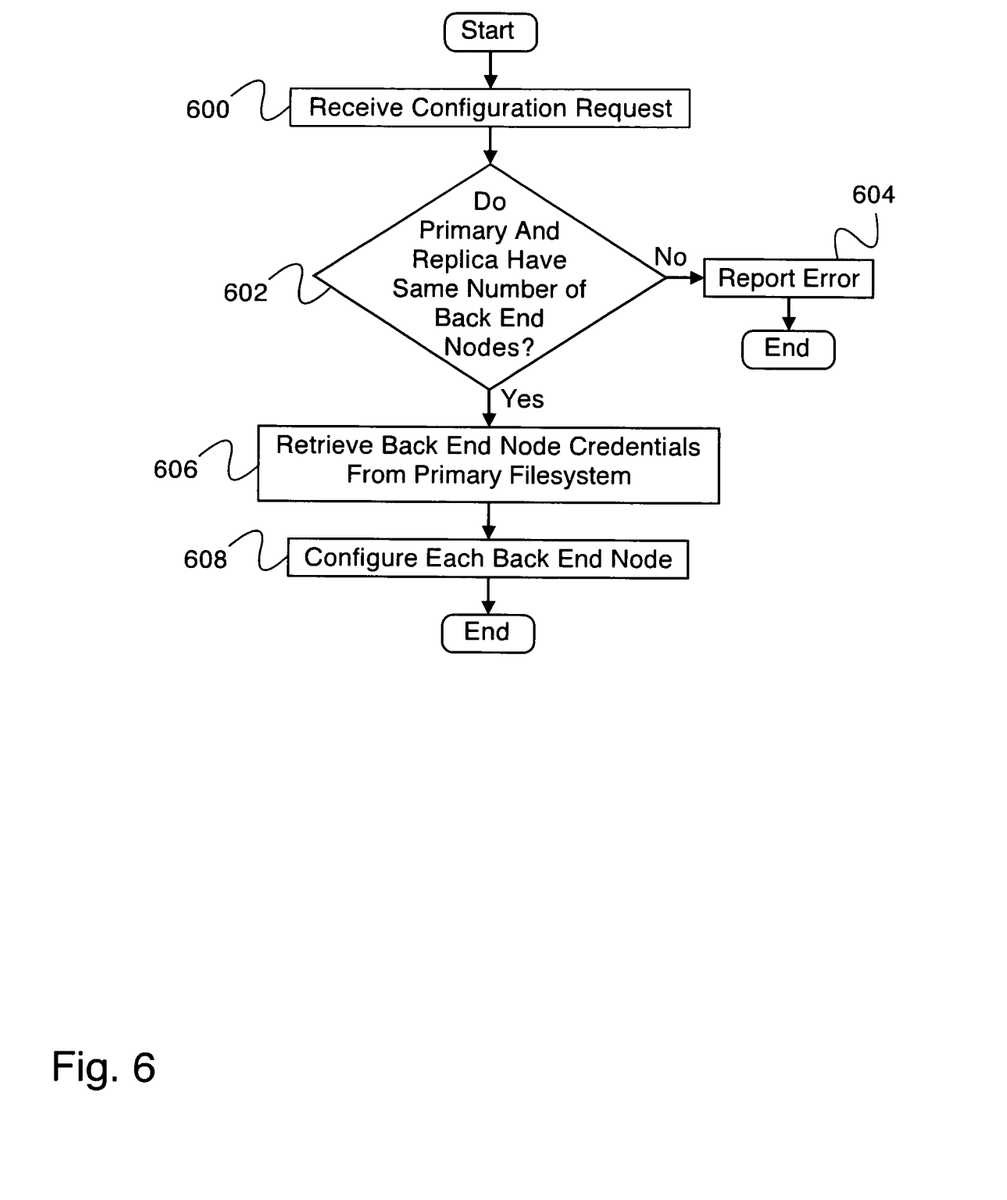
FIG. 6 is a flow diagram illustrating an embodiment of a process for configuring a system for asynchronous multi-node filesystem coordinated replication.

FIG. 6 is a flow diagram illustrating an embodiment of a process for configuring a system for asynchronous multi-node coordinated filesystem replication. In some embodiments, a replicating filesystem (e.g., the replicating filesystem of FIG. 4) uses the process of FIG. 6 for configuration. In the example shown, in 600, a configuration request is received. In 602, the filesystem compares the number of back end nodes in the primary system and the replica system. In the event that the primary and replica do not have the same number of nodes, control passes to 604. In 604, an error is reported, and the process ends. In the event that the primary and replica have the same number of back end nodes, control passes to 606. In 606, the system retrieves the back end node credentials from the primary filesystem. In various embodiments, back end node credentials comprise identification data (e.g., unique source or destination identifier, key, etc.), authentication data (e.g., checksum, error detection code, error correction code, etc.), encryption data (e.g., encryption seed, encryption key, etc.), or any other appropriate back end node credentials. In 608, each back end node is configured, and the process ends. In some embodiments, configuring each back end node comprises pairing each back end node in the primary filesystem with a back end node in the replica filesystem and providing the back end nodes in the primary filesystem with instructions for transmitting data to their associated back end nodes in the replica filesystem. In various embodiments, communications from the back end nodes are identified, authenticated, encrypted, or validated in any other appropriate way using the back end node credentials. For example, communications between two corresponding nodes in the primary and replica systems are identified such that it can be determined if the any communications between the two nodes have been lost (e.g., a sequence indicator for communications in one direction or in both directions).

Figure 7:
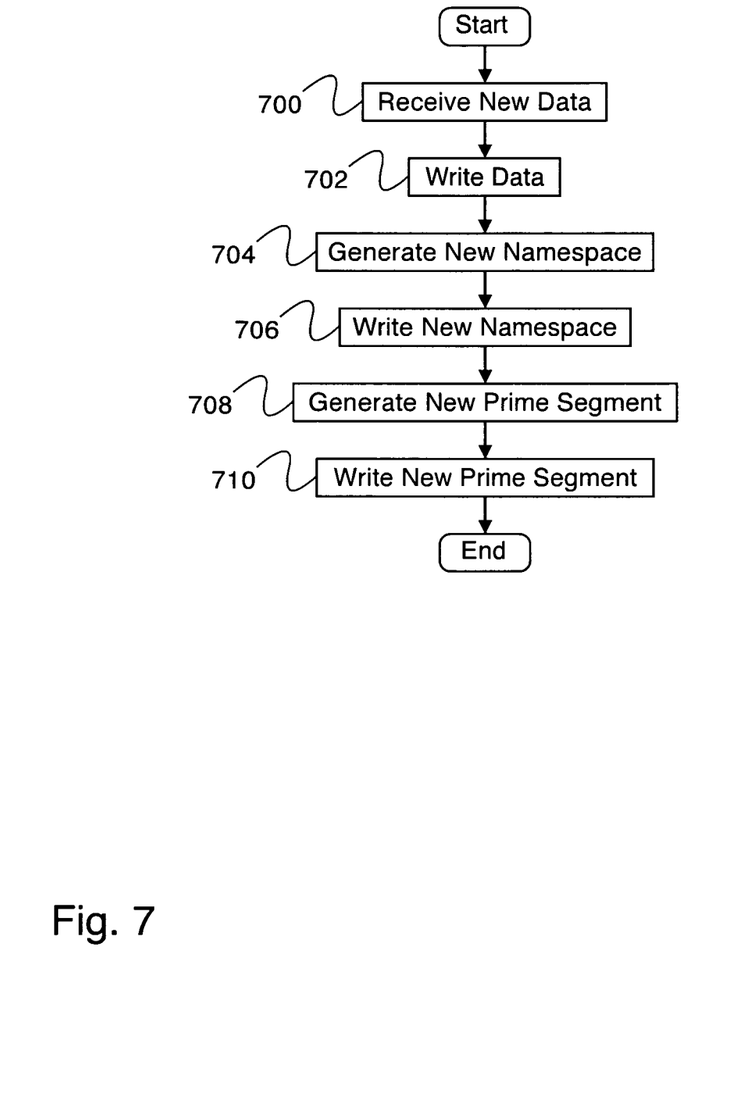
FIG. 7 is a flow diagram illustrating an embodiment of a process for receiving and storing data.

FIG. 7 is a flow diagram illustrating an embodiment of a process for receiving and storing data. In some embodiments, the process of FIG. 7 is used by a filesystem (e.g., the filesystem of FIG. 2) for receiving and storing data. In the example shown, in 700, new data is received. In 702, the data is written to data storage. In some embodiments, the data is broken into segments prior to being written to data storage. In some embodiments, the data segments are stored on one or more back end data storage nodes. In some embodiments, after the data segments are stored on the one or more back end data storage nodes, each of the one or more back end data storage nodes transmits the data to an associated back end storage node of a replica system. In 704, a new namespace is generated. In some embodiments, the new namespace comprises instructions for retrieving data that has been stored by the filesystem. In 706, the new namespace is written to data storage. In some embodiments, the namespace is broken into segments prior to being written to data storage. In some embodiments, the segments of the namespace are stored on one or more back end data storage nodes. In some embodiments, after the segments of the namespace are stored on the one or more back end data storage nodes, each of the one or more back end data storage nodes transmits the segments of the namespace to an associated back end storage node of a replica system. In 708, a new prime segment is generated. In some embodiments, the prime segment comprises instructions for retrieving the stored namespace. In some embodiments, the prime segment additionally comprises a version number. In 710, the new prime segment is written to data storage. In some embodiments, the prime segment is stored to one or more back end data storage nodes. In various embodiments, identical prime segments are stored to each of the one or more back end data storage nodes, modified versions of the prime segment are stored to each of the one or more back end data storage nodes, segments of the prime segment are stored on each of the one or more back end data storage nodes, or the prime segment is stored on the one or more back end data storage nodes in any other appropriate way. In some embodiments, after the prime segment is stored on the one or more back end data storage nodes, each of the one or more back end data storage nodes transmits the prime segment to an associated back end storage node of a replica system.

Figure 8:
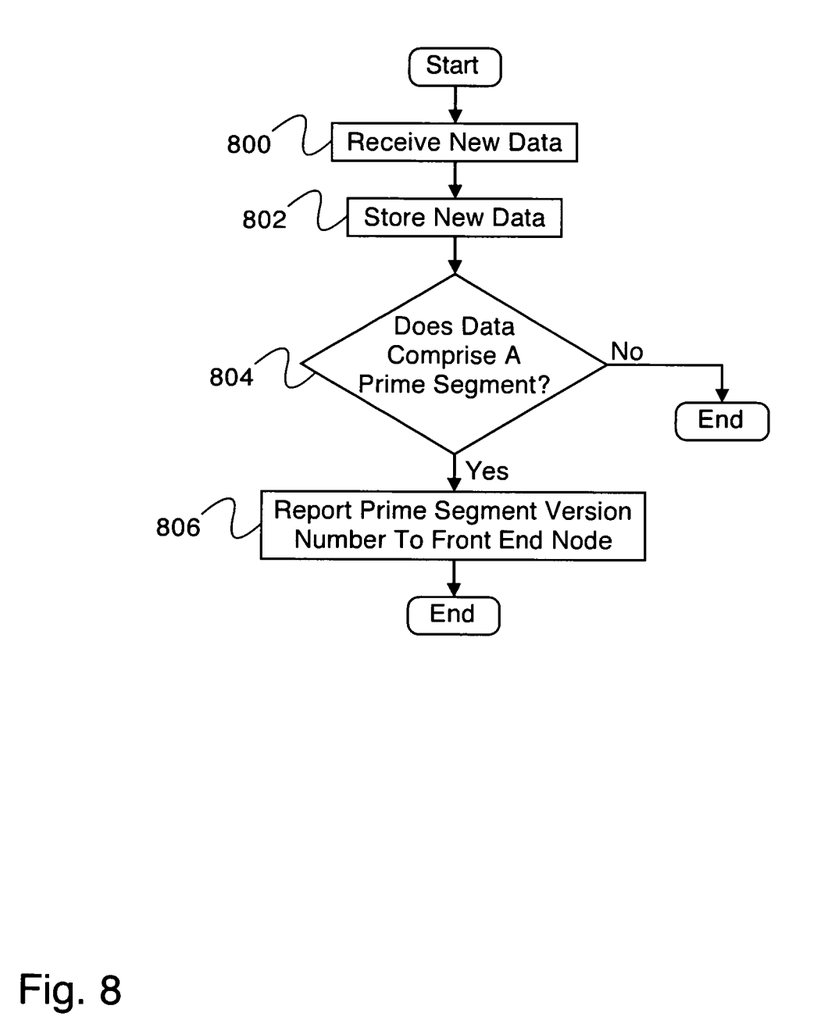
FIG. 8 is a flow diagram illustrating an embodiment of a process for receiving and storing data on a back end storage node of a replica system.

FIG. 8 is a flow diagram illustrating an embodiment of a process for receiving and storing data on a back end storage node of a replica filesystem. In some embodiments, the process of FIG. 8 is used by a back end storage node on a replica system (e.g., back end storage node 414 of FIG. 4, back end storage node 416 of FIG. 4, or back end storage node 418 of FIG. 4) for storing data. In the example shown, in 800, new data is received. In some embodiments, the new data is received from an associated back end storage node on a primary filesystem. In various embodiments, the data received from the back end nodes is identified, authenticated, encrypted, or validated in any other appropriate way using back end node credentials (e.g., back end node credentials received in 606 of FIG. 6). In 802, the new data is stored. In 804, the system determines if the data comprises a prime segment. In the event that the data does not comprise a prime segment, the process ends. In the event that the data comprises a prime segment, control passes to 806. In 806, the prime segment version number is reported to the front end storage node (e.g., front end storage node 412 of FIG. 4), and the process ends.

Figure 9:
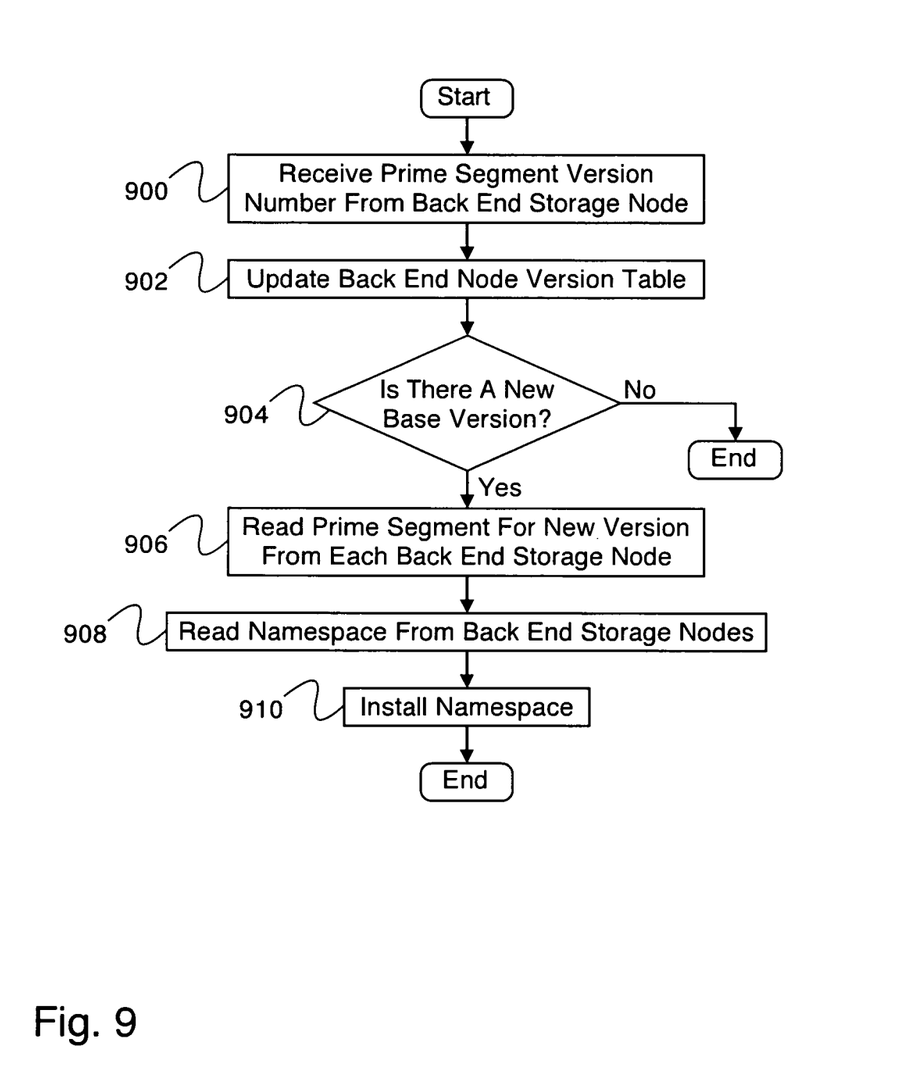
FIG. 9 is a flow diagram illustrating an embodiment of a process for coordinating a filesystem view.

FIG. 9 is a flow diagram illustrating an embodiment of a process for coordinating a filesystem view. In some embodiments, the process of FIG. 9 is used by a front end storage node on a replica system (e.g., front end storage node 412 of FIG. 4) for coordinating a filesystem view. In the example shown, in 900, a prime segment version number is received from a back end storage node (e.g., back end storage node 414 of FIG. 4, back end storage node 416 of FIG. 4, or back end storage node 418 of FIG. 4). In 902, the back end node version table (e.g., back end node version table 500 of FIG. 5) is updated. In some embodiments, updating the back end node version table comprises adding the received prime segment version number to the column of the back end node version table associated with the back end storage node that the prime segment version number was received from. In 904, the system determines if there is a new base version. In some embodiments, the base version is the highest prime segment version which all back end nodes have reported receiving. There is a new base version if receiving the prime segment version from the back end storage node cause the base version to increase. In the event that there is not a new base version, the process ends. In the event that there is a new base version, control passes to 906. In 906, the prime segment for the new version is read from each back end storage node. In some embodiments, the prime segment comprises instructions for recreating the namespace from segments stored on the back end storage nodes. In 908, the namespace is read from the back end storage nodes. In some embodiments, the namespace is stored as segments on the one or more back end storage nodes, and is reconstructed from the segments after they are read from the one or more back end storage nodes. In 910, the namespace is installed. In some embodiments, installing the namespace comprises making the new namespace the namespace that is referenced when a user requests a file from the filesystem.

Figure 10:
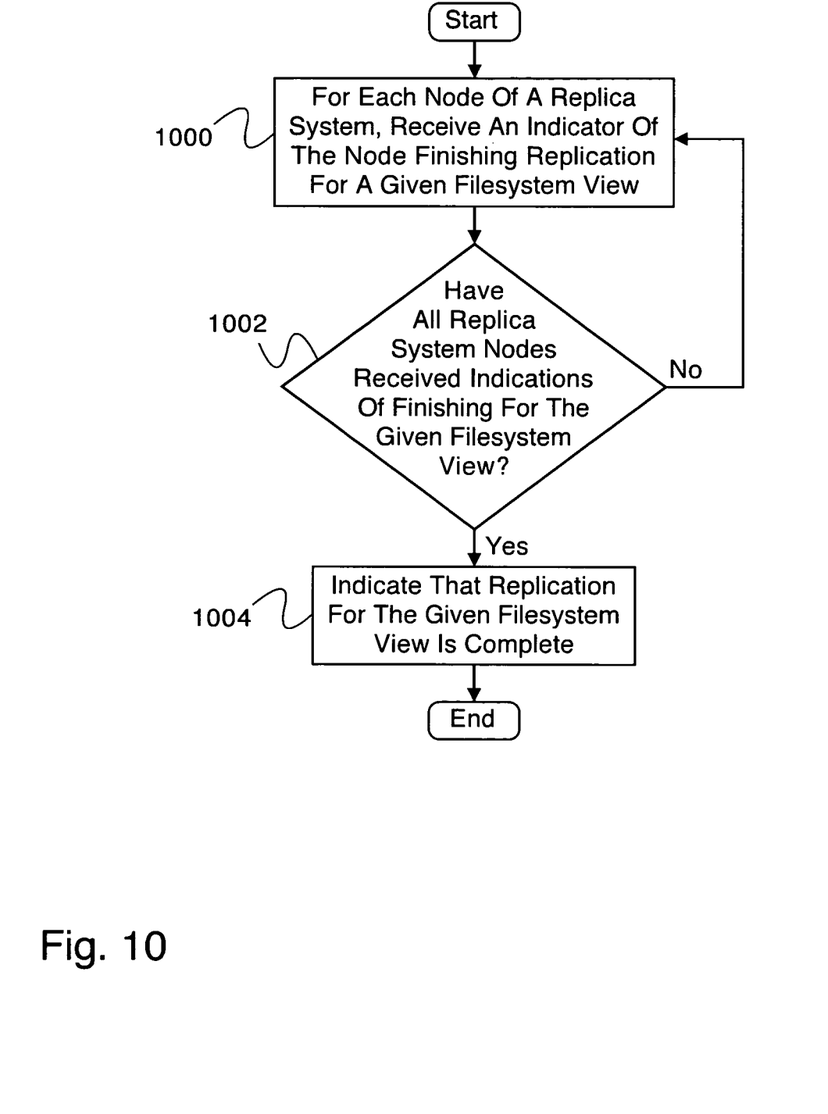
FIG. 10 is a flow diagram illustrating an embodiment of a process for asynchronous multi-node coordinated filesystem replication.

FIG. 10 is a flow diagram illustrating an embodiment of a process for asynchronous multi-node coordinated filesystem replication. In some embodiments, the process of FIG. 10 is used by a replicating filesystem (e.g., the replicating filesystem of FIG. 4) for asynchronous multi-node coordinated filesystem replication. In the example shown, in 1000, for each node of a replica system, an indicator of the node finishing replication for a given filesystem view is received. In some embodiments, each node of the replica system additionally receives replica data. In some embodiments, each node of the replica system additionally receives replica metadata. In 1002, receipt of the indicator of finishing is confirmed for all replica system nodes. In the event that all replica system nodes have received their indications of finishing for the given filesystem view, control passes to 1004. In 1004, completion of replication for the given filesystem view is indicated, and the process ends. In the event that all replica system nodes have not received their indications of finishing for the given filesystem view in 1002, control passes to 1000.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for replicating a filesystem running on multiple nodes comprising:
   an originator system including a plurality of nodes including a plurality of back end nodes that includes a first back end node, and a first front end node, wherein the first front end node is configured to receive data to be stored, break the data into a plurality of segments, and store each segment on one of the plurality of back end nodes; create a namespace comprising information to reconstruct the data from the segments stored on the backend nodes, and store the namespace in namespace segments on the plurality of back end nodes; and create and store on said plurality of backend segments a prime segment including information to reconstruct the namespace from said namespace segments stored on the plurality of back end nodes, as well as a version number indicating a current version of the namespace;
   a replica system including a plurality of nodes including a plurality of back end nodes that includes a second back end node, and a second front end node, the second back end node and the second front end node being respectively paired to the first back end node and the first front end node, wherein each of the plurality of back end nodes comprising the originator system is configured to replicate to a corresponding one of the plurality of back end nodes comprising the replica system those segments, namespace segments, and the prime segment stored on that back end node by said first front end node, and
   a processor comprising said second front end node comprising the replica system, the processor being configured to:
   receive from the second back end node a prime segment version number associated with a prime segment replicated to the second back end node from the first back end node;
   determine that the received prime segment version number comprises new highest prime version number that all of the back end nodes comprising the plurality of back end nodes comprising the replica system have reported; and
   make the received prime segment version number of the data available to a filesystem user of the replica system.

2. The system as in claim 1, wherein the plurality of nodes of the replica system are each configured to receive replica data.

3. The system as in claim 1, wherein the plurality of nodes of the replica system are each configured to receive replica metadata.

4. The system as in claim 1, wherein the plurality of nodes of the replica system are each configured to receive authentication data from a paired node of the plurality of nodes of the originator system.

5. The system as in claim 1, wherein the plurality of nodes of the replica system are each configured to receive identification data from a paired node of the plurality of nodes of the originator system.

6. The system as in claim 1, wherein the plurality of nodes of the replica system are each configured to receive encryption data from a paired node of the plurality of nodes of the originator system.

7. The system as in claim 1, wherein the processor of the replica system is further configured to check that all data packets sent by the originator have been received.

8. The system as in claim 1, wherein the processor of the replica system is further configured to check that all metadata packets sent by the originator have been received.

9. The system as in claim 1, wherein the processor of the replica system is further configured to assemble a consistent filesystem view from received replica metadata.

10. A method for replicating a filesystem running on multiple nodes comprising:
    using a processor to pair each of a plurality of back end nodes of an originator system with a corresponding one of a plurality of back end nodes of a replica system;
    using the processor to replicate data from each of said plurality of back end nodes of the originator system onto the corresponding one of said back end nodes of the replica system, the data comprising for each of said back end nodes of the originator system one or more data segments, namespace segments, and a prime segment stored on the back end node of the originator system by a front end node of the originator system, the front end node of the originator system being configured to receive data to be stored, break the data into a plurality of data segments, and store each segment on one of the plurality of back end nodes; create a namespace comprising information to reconstruct the data from the segments stored on the backend nodes, and store the namespace in namespace segments on the plurality of back end nodes; and create and store on said plurality of backend segments the prime segment, the prime segment including information to reconstruct the namespace from said namespace segments stored on the plurality of back end nodes, as well as a version number indicating a current version of the namespace;

using the processor to receive at a front end node of the replica system a prime segment version number associated with a prime segment replicated to a back end node comprising the replica system;

using the processor to determine that the received prime segment version number comprises new highest prime version number that all of the back end nodes comprising the plurality of back end nodes comprising the replica system have reported; and using the processor to make the received prime segment version number of the data available to a filesystem user of the replica system.

11. The method as in claim 10, wherein the plurality of nodes of the replica system are each configured to receive replica data.

12. The method as in claim 10, wherein the plurality of nodes of the replica system are each configured to receive replica metadata.

13. The method as in claim 10, wherein the plurality of nodes of the replica system are each configured to receive authentication data from a paired node of the plurality of nodes of the originator system.

14. The method as in claim 10, wherein the plurality of nodes of the replica system are each configured to receive identification data from a paired node of the plurality of nodes of the originator system.

15. The method as in claim 10, wherein the plurality of nodes of the replica system are each configured to receive encryption data from a paired node of the plurality of nodes of the originator system.

16. The method as in claim 10, further comprising checking that all replica data packets have been received.

17. The method as in claim 10, further comprising checking that all replica metadata packets have been received.

18. The method as in claim 10, further comprising assembling the filesystem view from received replica metadata.

19. A computer program product for replicating a filesystem running on multiple nodes, the computer program product being embodied in a non-transitory computer readable storage medium and comprising computer instructions for:

pairing each of a plurality of back end nodes of an originator system with a corresponding one of a plurality of back end nodes of a replica system;

replicating data from each of said plurality of back end nodes of the originator system onto the corresponding one of said back end nodes of the replica system, the data comprising for each of said back end nodes of the originator system one or more data segments, namespace segments, and a prime segment stored on the back end node of the originator system by a front end node of the originator system, the front end node of the originator system being configured to receive data to be stored, break the data into a plurality of data segments, and store each segment on one of the plurality of back end nodes; create a namespace comprising information to reconstruct the data from the segments stored on the backend nodes, and store the namespace in namespace segments on the plurality of back end nodes; and create and store on said plurality of backend segments the prime segment, the prime segment including information to reconstruct the namespace from said namespace segments stored on the plurality of back end nodes, as well as a version number indicating a current version of the namespace;

receiving at a front end node of the replica system a prime segment version number associated with a prime segment replicated to a back end node comprising the replica system;

determining that the received prime segment version number comprises new highest prime version number that all of the back end nodes comprising the plurality of back end nodes comprising the replica system have reported; and make the received prime segment version number of the data available to a filesystem user of the replica system.

20. The computer program product recited in claim 19, wherein the plurality of nodes of the replica system are each configured to receive replica data.

21. The computer program product recited in claim 19, wherein the plurality of nodes of the replica system are each configured to receive replica metadata.

22. The computer program product recited in claim 19, wherein the plurality of nodes of the replica system are each configured to receive authentication data from a paired node of the plurality of nodes of the originator system.

23. The computer program product recited in claim 19, wherein the plurality of nodes of the replica system are each configured to receive identification data from a paired node of the plurality of nodes of the originator system.

24. The computer program product recited in claim 19, wherein the plurality of nodes of the replica system are each configured to receive encryption data from a paired node of the plurality of nodes of the originator system.

25. The computer program product recited in claim 19, further comprising checking that all replica data packets have been received.

26. The computer program product recited in claim 19, further comprising checking that all replica metadata packets have been received.

27. The computer program product recited in claim 19, further comprising assembling the filesystem view from received replica metadata.

* * * * *